United States Patent
Laberteaux et al.

(10) Patent No.: US 8,359,132 B2
(45) Date of Patent: Jan. 22, 2013

(54) SYSTEM AND METHOD FOR OPTIMIZING USE OF A BATTERY

(75) Inventors: Kenneth P. Laberteaux, Ann Arbor, MI (US); Charles E. Gulash, Ann Arbor, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 156 days.

(21) Appl. No.: 12/816,832

(22) Filed: Jun. 16, 2010

(65) Prior Publication Data

US 2011/0313603 A1 Dec. 22, 2011

(51) Int. Cl.
| | |
|---|---|
| B60L 9/00 | (2006.01) |
| B60L 11/00 | (2006.01) |
| G05D 1/00 | (2006.01) |
| G05D 3/00 | (2006.01) |
| G06F 7/00 | (2006.01) |
| G06F 17/00 | (2006.01) |
| H02J 7/14 | (2006.01) |

(52) U.S. Cl. .......................................... 701/22; 320/104
(58) Field of Classification Search .................. None
See application file for complete search history.

(56) References Cited

U.S. PATENT DOCUMENTS

| | | | |
|---|---|---|---|
| 5,099,486 A | 3/1992 | Acharekar et al. | |
| 5,642,270 A | 6/1997 | Green et al. | |
| 2004/0263116 A1 | 12/2004 | Doruk et al. | |
| 2008/0007202 A1* | 1/2008 | Pryor | 320/104 |
| 2008/0040223 A1 | 2/2008 | Bridges et al. | |
| 2009/0021218 A1* | 1/2009 | Kelty et al. | 320/137 |
| 2009/0091291 A1 | 4/2009 | Woody et al. | |
| 2009/0313033 A1 | 12/2009 | Hafner et al. | |
| 2010/0019718 A1 | 1/2010 | Salasoo et al. | |
| 2010/0211643 A1* | 8/2010 | Lowenthal et al. | 709/206 |

FOREIGN PATENT DOCUMENTS

| | | |
|---|---|---|
| WO | WO-2007104167 A1 | 9/2007 |
| WO | WO-2008073476 A2 | 6/2008 |

* cited by examiner

*Primary Examiner* — Paul Danneman
(74) *Attorney, Agent, or Firm* — Gifford, Krass, Sprinkle, Anderson & Citkowski, P.C.

(57) ABSTRACT

A battery optimization system and method for regulating and discharging a battery so as to optimize the use of the battery in accordance with the user's preference is provided. The battery optimization system includes a power source, a charging/discharging station connecting the battery with the power source, and a controller in communication with the charging/discharging station. The battery optimization system further includes an input operable to provide the user's preferences. The controller is also in communication with the battery and is operable to process battery and power source information along with user input to calculate an optimal charging/discharging cycle. The charging/discharging cycle is configured to charge or discharge the battery so as to optimize the use of the battery based upon the end user's preference. For instance, the calculated optimal charging/discharging cycle may be based upon the user's desire to maximize the life of the battery, or to charge the battery as inexpensively as possible.

21 Claims, 11 Drawing Sheets

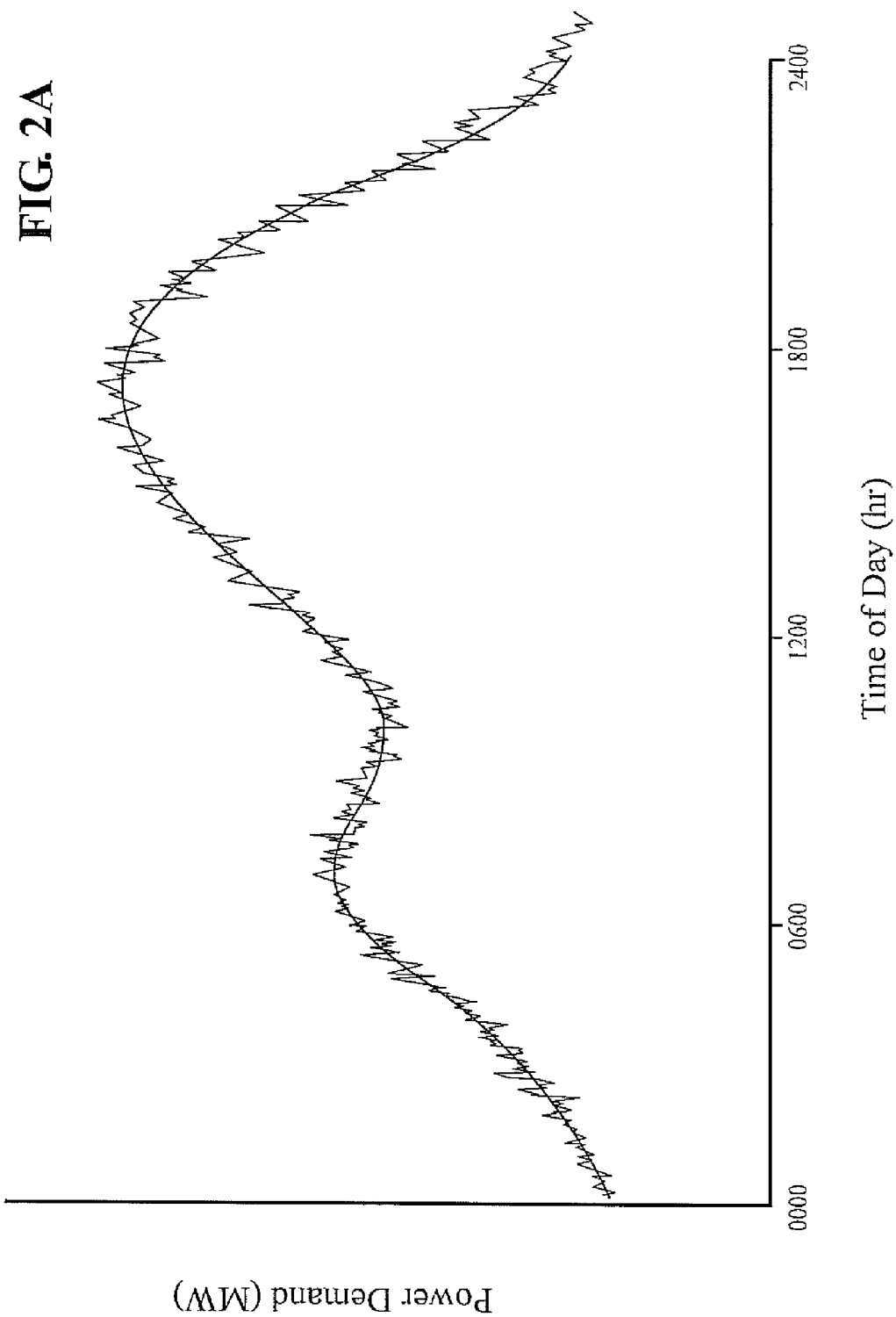

SYSTEM AND METHOD FOR OPTIMIZING USE OF A BATTERY

FIELD OF THE INVENTION

The present invention relates to a battery optimization system for regulating the charging and discharging of a battery so as to optimize the use of the battery in accordance with the user's preference. The battery optimization system includes a controller operable to process information so as to calculate an optimal charging/discharging cycle. The battery optimization system also includes an input operable to provide user preferences. The controller is further operable to process user input, battery status and the state of the power source so as to charge or discharge the battery in accordance with the user's preference.

BACKGROUND OF THE INVENTION

The concept of drawing and supplying energy between a battery and a power grid is known. Such a concept when applied to a vehicle battery and power grid is commonly referred to as vehicle to grid/grid to vehicle (V2G/G2V). The vehicle battery draws power as needed and supplies power during times when the battery has a surplus of power. For instance, at certain periods, also referred to as peak periods, of the day the load demand placed upon the grid may strain the supply available. In such instances, the grid requires auxiliary power sources to meet the excess demand. As a result, power supplied by the grid during these times is often sold at a premium price, also referred to as a peak-rate. "Peak-rate" as used herein refers to the price of power when the power source must obtain auxiliary power to meet the load demand. The peak-rate is often more costly than other times as the power source has to pay for additional power to meet the power demand. In other periods of the day the power demand is well below the power available and thus power supplied during these "off-peak" periods is often sold at a reduced rate. With the popularity and dissemination of what is commonly referred to as plug-in electric vehicles, power sources such as commercial grids will have a potentially large source of power to tap into during peak times.

Naturally, the power source also charges the batteries. Accordingly, it may be advantageous for users of plug-in vehicles to only charge their batteries during off-peak times so as to minimize their vehicle's operating costs. However, there may be instances where the user would rather pay a premium peak rate to charge their battery.

With reference to FIGS. 2A and 2B, a graph showing the general demand cycle of a power source such as a utility grid in a 24-hour period is provided. The period during which most vehicles are not being used and are available for charging, i.e. in the middle of the day and generally at night, provides two different rates. Charging the vehicle in the middle of the day may coincide with peak times, thus the user may pay a premium price. Conversely the user may pay a bargain price for charging the vehicle during off-peak hours, such as at night. Further, the power source may provide premium credit for drawing power from a battery during the day as opposed to at night when power demand is well below the power source's capacity. Accordingly, it remains desirable to have a battery optimization system which generates a charging/discharging cycle that takes advantage of the lower rates provided during off-peak times.

Many users drive their vehicles for extended periods of time twice a day, the first period going to work and the second period coming home from work. The drive may consume such a large amount of power from the battery that it is necessary for the driver to charge the battery while at work and again at night. However, in some instances only one full charge is needed to support the drive to and from work. Thus, it may be advantageous from a cost perspective to fully charge the battery at night and partially during the day.

With reference now to FIG. 3, a chart showing the life of a vehicle battery with respect to the depth of discharge is provided. As shown, a daily deep discharge and recharge cycle can significantly shorten the life of the battery. However, small discharges and recharges will extend the life of the battery. Furthermore, each battery has its own optimal charging/discharging cycle for extending the life of the battery. For instance some batteries require a full discharge prior to recharging the battery in order to optimize the life of the battery while other batteries will optimize their life when small depth discharges and recharges occur.

"Charging/discharging cycle" as used herein refers to the depth and rate of the charge and discharge of power from the battery. Thus certain battery usage may be optimal for charging and discharging the battery so as to extend the life of the battery while other usage patterns will shorten the life of the battery as the charge and discharge from the battery is not in accordance with the battery's optimal charging/discharging cycle.

The optimal charging/discharging cycle may be affected by the material used to make the battery, the usage of the battery, the temperature in which the battery operates, and the like. For instance, it is known that the optimal charging/discharging cycle of a Nickel Metal Hydride Battery is different from that of a Lithium Ion Battery. In some instances it may not be practical to charge the battery in accordance with a charging/discharging cycle that maximizes the life of the battery. For instance, the battery's power may be low and the user may only have a relatively short period of time to charge the battery. In such a case the user may opt to forego charging the battery at a charging/discharging cycle that is optimal to extend the life of the battery and rather charge the battery at a charging/discharging cycle that draws as much power as possible in as short a time as possible. In other instances the user may be more cost conscious and thus only desire to charge the battery during times when the power source rate is at a low and may only desire to supply power to the power source at the highest rate of return.

Accordingly it remains desirable to have a battery optimization system operable to calculate an optimal charging/discharging cycle of a battery so as to achieve the end goal of the user. Such a battery optimization system allows for dynamic optimization of battery use that meets the changing preferences of the end user. For instance, the user may base the charging/discharging cycle upon either the desire to extend the life of the battery as long as possible, reduce the cost of operating and maintaining the battery, or to have the battery at full capacity in as short a time as possible. Furthermore, the battery optimization system may calculate an optimal charging/discharging cycle based not only upon user preference, but the state of the battery, and the power source.

SUMMARY OF THE INVENTION

According to one aspect of the invention a battery optimization system and method for regulating and discharging a battery so as to optimize the use of the battery in accordance with the user's preference is provided. The battery optimization system includes a power source, a charging/discharging station connecting the battery with the power source, and a controller in communication with the power source and/or charging/discharging station. The controller is also in communication with the battery and is operable to process battery and power source information along with user input to calculate an optimal charging/discharging cycle. The optimal charging/discharging cycle is configured to charge or discharge the battery so as to optimize the use of the battery based upon the end user's preference.

In operation, the controller processes information received from the power source, the battery, and the user to calculate the optimal charging/discharging cycle. The controller is further operable to actuate the charging/discharging station so as to charge or discharge the battery according to the calculated optimal charging/discharging cycle. Accordingly, the optimal charging/discharging cycle may vary depending upon the state of the power source, the desires of the user, and the state of the battery.

According to another embodiment of the invention a battery optimization system for charging and discharging a battery of an electric vehicle is provided. The battery is operable to assist with the actuation of the electric vehicle's drive train. The electric vehicle includes a connector for connecting the vehicle to a power source so as to charge or discharge the battery, and an input for providing user preferences. The electric vehicle further includes a controller. The controller is in communication with the power source, the connector, the input, and the battery. The controller is operable to process the battery and power source information along with user preference to calculate an optimal charging/discharging cycle that is based upon the user's preferences.

BRIEF DESCRIPTION OF THE DRAWINGS

Advantages of the present invention will be readily appreciated as the same becomes better understood by reference to the following detailed description when considered in connection with the accompanying drawings wherein:

FIG. 2A is a chart showing the demand of power throughout a 24-hour period and the relative spikes in the demand;

DETAILED DESCRIPTION OF THE INVENTION

Figure 1:
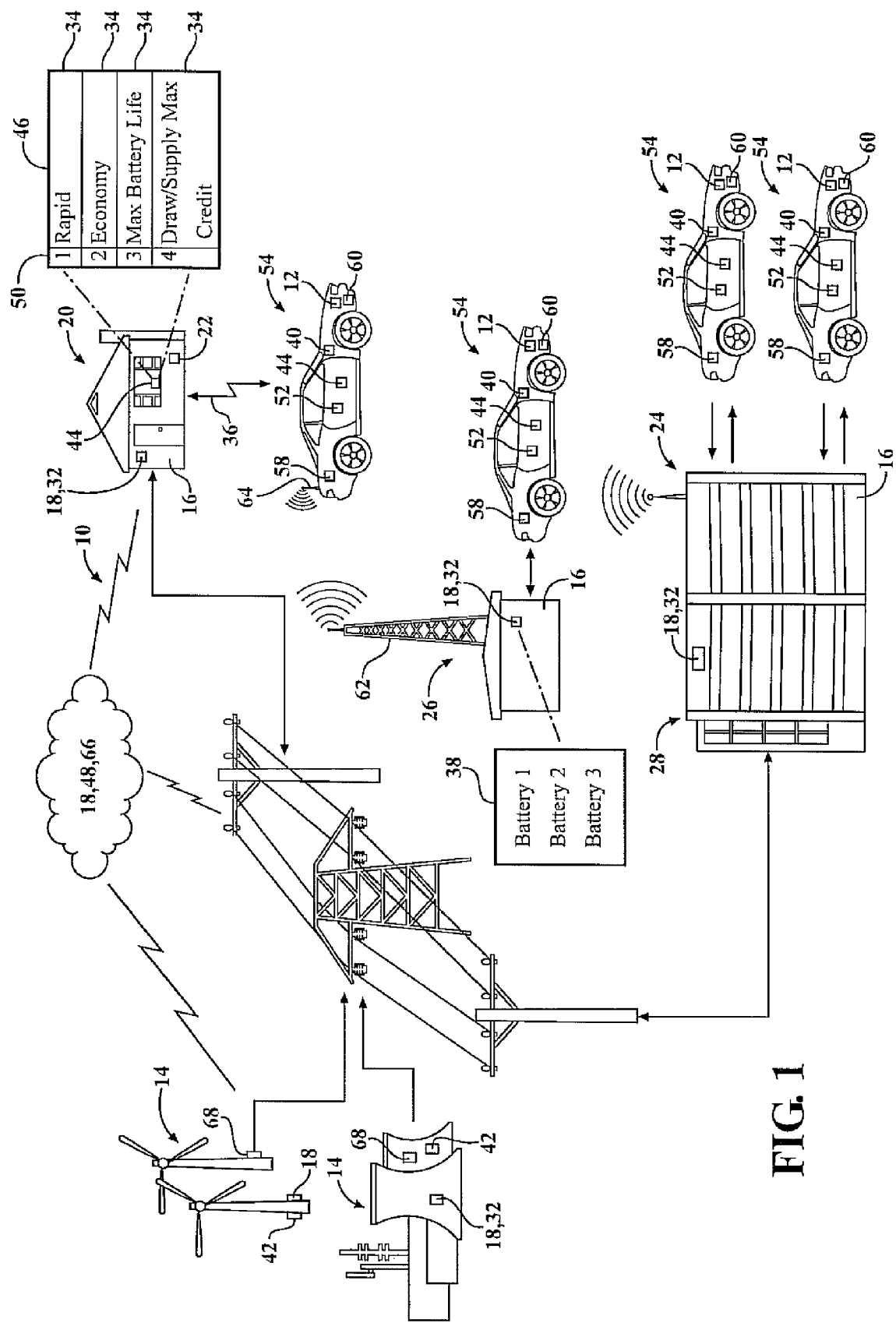
FIG. 1 is a perspective view of the battery optimization system according to one embodiment of the invention.

Referring to the figures, a battery optimization system 10 for regulating charging and discharging of a battery 12 so as to optimize the use of the battery 12 in accordance with a user's preference is provided. The battery optimization system 10 includes a power source 14, a charging/discharging station, "CD Station 16," and a controller 18. The power source 14 may be a local power provider or a larger commercial power provider such as a publicly held utility company. The CD Station 16 connects the battery 12 with the power source 14. The CD Station 16 may be disposed in a residential house 20 and is in communication with a power outlet 22 such as a utility plug. The power outlet 22 may also be disposed in a workplace 24, or a public place 26 such as the parking lots of shopping malls and the like.

The controller 18 may be in communication with either the CD Station 16, power source 14, and/or the battery 12. The battery 12 may be a lithium-ion battery. Preferably, the battery 12 is configured to store sufficient power to support the end use of the device the battery 12 is powering. For instance, in automotive applications, the battery 12 is operable to store several Kilo-Watts, whereas in cell phone application, the battery is operable to store significantly less power. It should be appreciated by those skilled in the art that smaller batteries 12 such as Lithium Ion Batteries for use in devices such as cell phones may be used in the battery optimization system 10 of the present invention.

With reference now to FIG. 1, an illustration of the battery optimization system 10 is provided. The controller 18 may be placed in various locations to include workplaces 24, commercial facilities 28, public places 26, residential homes 20, an automotive vehicle 54, or at the power source 14. The controller 18 includes a processor 32 operable to calculate an optimal charging/discharging cycle, also referenced herein as OCDC 34. The OCDC 34 is configured to charge or discharge the battery 12 so as to optimize the use of the battery 12 in accordance with the user's preference. The controller 18 further actuates the CD Stations 16 so as to charge or discharge the battery 12 according to the calculated optimal charging/discharging cycle.

The processor 32 is configured to receive information regarding the battery 12, the state of the power source 14, forecasted power demand, predicted load 36 requirements of the battery 12, user information, and the like. The power source 14 provides information to the controller 18 such as the current load level and load demand. The power source 14 may also provide information such as the cost for drawing power from the power source 14 or the refund/credit for supplying power to the power source 14.

Preferably, the controller 18 is programmed with a list of batteries 38 having information for each battery 12 in the list, such as maximum storage capacity, the charging/discharging cycle optimal to extend the life of the battery 12, the material composition of the batteries 12, and the like. The list of batteries 38 may further include other information which affects the charging/discharging cycle of the battery 12. For instance, the list of batteries 38 may include the charging/discharging cycle configured to charge the battery 12 in the shortest time possible; a chart showing how temperature affects the charging/discharging cycle of a particular type of battery 12, and the like. Alternatively, the user may download the information of a particular battery 12 into the controller 18. As a default option the controller 18 may automatically select the charging/discharging cycle which is optimal for extending the life of the battery 12, or a user's default preference.

The battery optimization system 10 may include a first sensor 40 in communication with the battery 12. The first sensor 40 is operable to detect the level of power in the battery 12, such as a voltmeter. The controller 18 is also in communication with the first sensor 40. The controller 18 processes the level of power in the battery 12 so as to selectively actuate the CD Station 16 in accordance with a charging/discharging cycle that is associated with the level of power in the particular battery 12. The controller 18 then actuates the CD Station 16 so as to charge or discharge the battery 12 in accordance with the selected optional charging/discharging cycle.

The battery optimization system 10 may further include a second sensor 42 in communication with the power source 14 and the controller 18. The second sensor 42 is operable to detect the load demand of the power source 14. The controller 18 may process the load demand to selectively actuate the CD Station 16. Generally speaking the controller 18 leverages the load demand of the power source 14 with the load demand of the battery 12 and the user's preferences to selectively actuate the CD Station 16 so as to charge the battery 12 at the optimal charging/discharging cycle that is commensurate with the user's preference.

As discussed above, the optimal charging/discharging cycle is calculated based upon the state of the power source 14, the state of the battery 12, and user preference. Accordingly the battery optimization system 10 may further include an input 44 in communication with the controller 18. The input 44 may be a computer terminal that is connected either remotely or directly to the controller 18. The input 44 may include a list of preferences 46 from which the user may choose.

The controller 18 may be housed remotely on a server 48 and provided as part of a subscription service to users. Each user may use a computer terminal, or a mobile handheld device such as a phone to input their preferred OCDC 34. For instance, the user may be able to select a charging/discharging cycle based upon economy wherein the power drawn from the power source 14 is only done when the cost of drawing power is relatively cheap.

Other preferences included in the list of preferences 46 may relate to other needs or preferences of the user. For instance, one of the charging/discharging cycles may be optimized so as to charge the battery 12 in a manner that maximizes the life of the battery 12 or to charge the battery 12 as rapidly as possible. Additionally, the user may have the option of always supplying power to the power source 14 when the power source 14 provides maximum money or credit for power, such as during peak times. The battery optimization system 10 may further allow the user to prioritize the selected charging/discharging cycles. Specifically, the input 44 may further include a ranking 50 in which the user may rank the preferences in the list of preferences 46. Thus the needs and the desires of the user are taken into account during charging and discharging operations. Further, the controller 18 can leverage the needs of the power grid with the demand of the user so as to optimize the charging/discharging cycle of the battery 12 in accordance with the user's preference.

The controller 18 may further include a load sensor 52. The load sensor 52 is in communication with the battery 12 and operable to detect the amount of load experienced by the battery 12. The controller 18 is further operable to store this information over a predetermined period of time so as to calculate a predicted load 36. The predicted load 36 not only accounts for how much power is drawn from the battery 12 over a predetermined period, but also the pattern of battery 12 discharge. The controller 18 processes the amount of load experienced by the battery 12 over the predetermined period of time so as to calculate the predicted load 36.

For instance, the battery 12 may be used in a vehicle 54. The load sensor 52 may detect that every weekday for the last month the vehicle 54 consumed 20% of the battery's 12 power twice a day. The load sensor 52 transmits this information to the controller 18, and the controller 18 processes the recorded loads so as to calculate a predicted load 36 for the succeeding weekdays.

The controller 18 can further process the predicted load 36 so as to selectively actuate the CD Station 16 in accordance with the user's desires. For example, assume the controller 18 detects that the battery 12 averages a discharge of 100 kilowatts between the hours of 0700 and 0800 every day, and further determines that the vehicle 54 remains idle between the periods of 0800 and 1700 and again discharges 100 kilowatts between 1700 and 1800 every weekday. The controller 18 may process the predicted load 36 requirements so as to actuate a charging/discharging cycle which may optimize the life of the battery 12.

Specifically, knowing that the battery 12 is generally available for charging between the hours of 0800 in the morning to 1700 in the afternoon, the controller 18 can then draw power so as to charge and discharge the battery 12 in accordance with the user's optimal charging/discharging cycle. For instance, if the user is concerned about cost, the controller 18 will calculate that it has eight hours in which to charge the battery 12 and can then charge the battery 12 at low rates throughout that hour period.

Figure 2B:
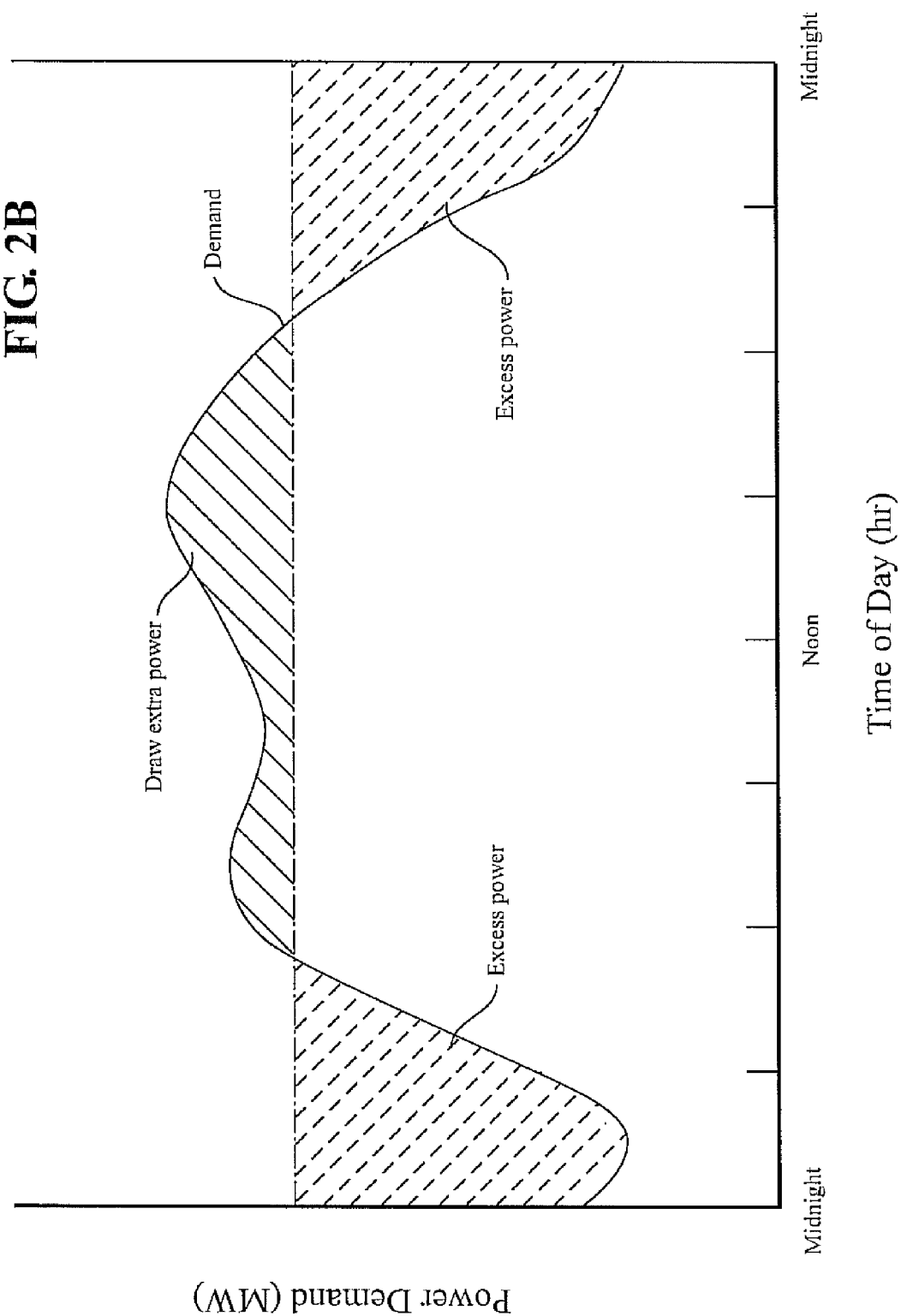
FIG. 2B is a chart showing the general periods in which the power is sold off or bought at a premium or bargain rate.

With reference now to FIGS. 2A and 2B, and assuming that the cost of power is a direct relationship to the demand, the power drawn from the power source 14 at the peak period is more expensive than power drawn at other times. Thus the controller 18 may calculate that only three hours are needed to fully charge the battery 12 and does so during the periods in which the power is not supplied at a peak rate. Alternatively if the user chooses a charging/discharging cycle that optimizes the life of the battery 12, the controller 18 may use that entire period between 0800 and 1700 to charge the battery 12 in accordance with a charging/discharging cycle which optimizes the life of the battery 12, i.e., smaller increments of charging and discharging patterns.

Figure 3:
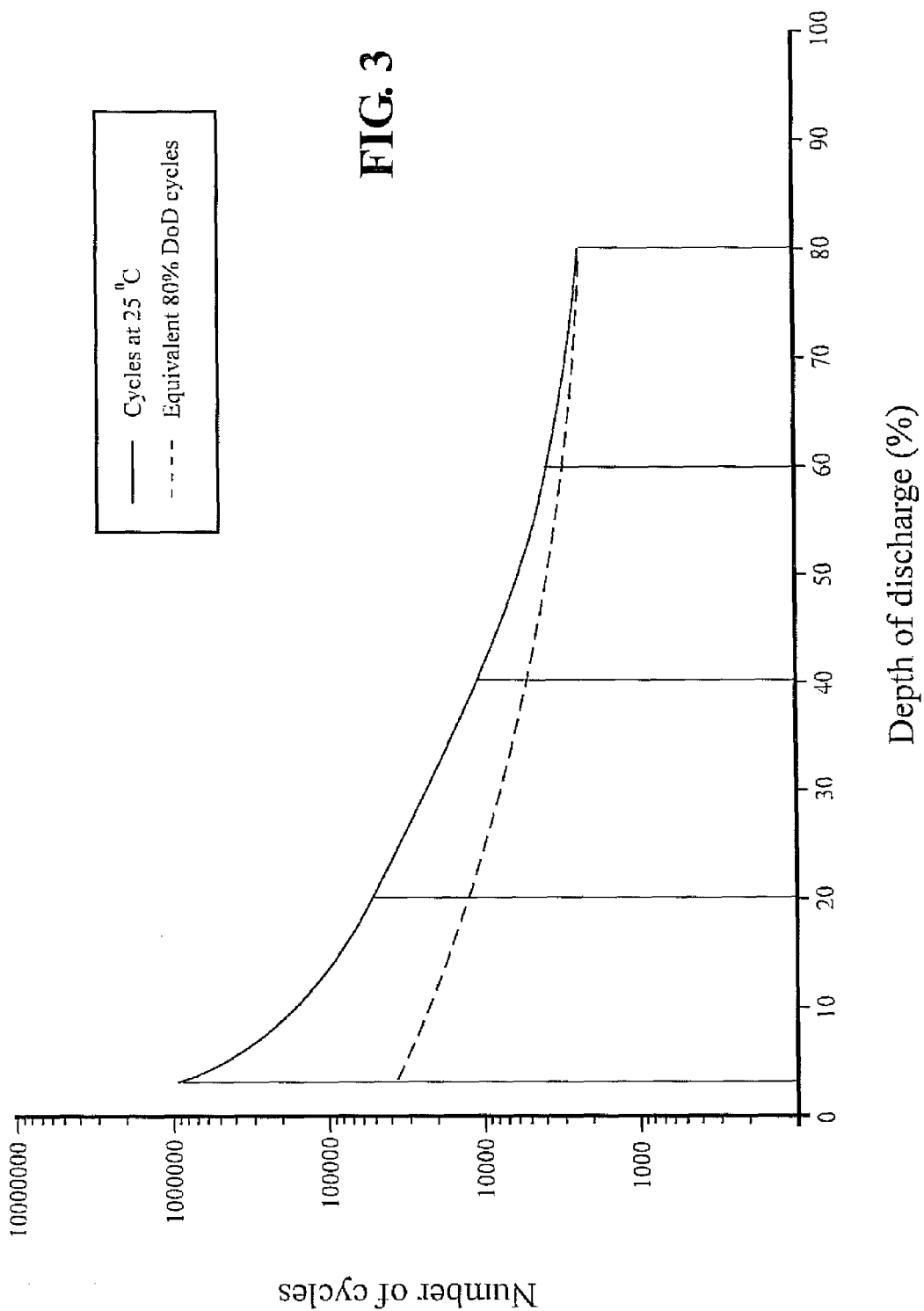
FIG. 3 is a chart showing the number of cycles relative to the depth of discharge for a particular battery.

As shown in FIG. 3, electric vehicles 56 batteries 12 generally maintain longer lives as the depth of discharges decreases. For instance if optimization of the life of the battery 12 is preferred by the user, such an optimization is best achieved by relatively low discharge and charging cycles. Accordingly, the controller 18 will actuate the CD Stations 16 so as to draw small incremental amounts of power throughout the day and deliver slightly larger incremental amounts of power to the battery 12 throughout the day.

The battery optimization system 10 may further include a regulator 58 in communication with the controller 18 and the power source 14. The regulator 58 is operable to control the amount of power supplied and drawn from the battery 12. Accordingly, the regulator 58 may help prevent the battery 12 from being damaged by accepting too much power in a short period of time. The regulator 58 may be a segment of a computer program that the controller 18 processes. The controller 18 actuates the regulator 58 so as to process the needs of the battery 12 with the load demand of the power source 14 and calculates an optimal charging/discharging rate. The controller 18 may process the calculated charging/discharging rate with information such as the state of the power source 14, the battery 12 and the user preference to calculate the OCDC 34.

For instance, if the user selects an OCDC 34 operable to charge the battery 12 in as short of time as possible, and the capacity of the power source 14 is above the demand, the regulator 58 calculates a charging/discharging rate that draws as much power from the power source 14 and actuates the regulator 58 so as to prevent the battery 12 from being damaged. Conversely, if the regulator 58 detects that the battery 12 is below fifty percent capacity, has six hours to charge, and two of those six hours occurs during peak periods, the controller 18 may calculate a charging/discharging rate that draws as much power as possible to fully charge the battery 12. The controller 18 is further operable to actuate the regulator 58 so as to charge the battery 12 prior to the peak period, and then supply power as quickly as possible to the power source 14 during the peak period so as to obtain money or credit for the user.

With reference again to FIG. 2A and assuming the same scenario as described above, there is a drop in power demand between the periods of 0900 and 1200. Accordingly it can be assumed that the availability for power at that time period is greater than the availability of power between the times of 1400 and 1600. In cases where the cost of power is directly related to the demand, the cost for the vehicle 54 to draw power from the power source 14 is greater between the hours of 1400 and 1600 than it is between the hours of 0900 and 1200 in the afternoon.

The controller 18 may further include an override 60 which is operable to prevent the CD Station 16 from charging the battery 12 when the load demand reaches a predetermined threshold. This override 60 may be desirable for users who wish to charge their batteries 12 at a rate other than the premium rate associated with peak times. With reference again FIGS. 2A and 2B, it is seen that the price of power may become more expensive when the power demand exceeds the available of power. In such instances where users do not want to pay a premium for power, the override 60 is operable to render the CD Station 16 inoperable so as to prevent the user from paying a peak rate.

The battery optimization system 10 may further include a receiver 62 and a transmitter 64. The receiver 62 may be operatively attached to the CD Station 16 and the transmitter 64 is operatively attached to the controller 18. The transmitter 64 transmits signals to the receiver 62 so as to selectively actuate the CD Station 16 remotely. With reference again to FIG. 1, the receivers 62 and transmitters 64 are selectively disposed at various locations in which the CD Stations 16 are disposed. The transmitter 64 transmits signals carrying battery 12, power source 14, and user information to the receiver 62. The receiver 62 receives the information and the controller 18 processes the information so as to selectively actuate the CD Station 16 remotely.

This may be very beneficial in instances where the user is away from the battery 12 for an extended period of time. For example if the user is on vacation for a month, the user may be able to access the CD Station 16 through a service provider such as a web-based service 66 provider and control the charging and discharging of the battery 12 remotely. The web-based service 66 provider may display information such as the current charging state of the battery 12. The user may access the controller 18 through a web-based service 66 provider, see the current state of the battery 12 and select a preferred charging/discharging cycle or cease charging and discharging the battery 12 altogether remotely. The controller 18 then transmits a signal to the remotely located battery 12, specifically to the discharging and charging station, so as to charge and discharge the vehicle 54 in accordance with the user's selection.

The battery optimization system 10 may further include a pricing agent 68. The pricing agent 68 is in communication with the power source 14 and is operable to provide a forecast for the price of drawing power from the power source 14 and the amount of refund or credit the user will receive for supplying power to the power source 14. The pricing agent 68 is in communication with the battery 12 as well and can process battery 12 information with load demand and forecasted load demand to provide the price for drawing power from the power source 14 at a particular period of time or credit the user for supplying power to the power source 14 at a particular period of time.

The battery optimization system 10 may actuate the pricing agent 68 to provide a refund or credit to the user. For example, assume the user is away on vacation and the battery 12 is fully charged. The pricing agent 68 may be operable to automatically supply power to the power source 14 during periods when the pricing agent 68 forecasts that the power source 14 is giving maximum refund or credit for power.

FIG. 2A shows that the demand on the power source 14 at any given time, varies with respect to the general demand over a 24 hour period. Though, commercial power sources 14 may plan on providing the general power demand for a given period, they must remain flexible to account for these small spikes in demand. Accordingly, having a bank of batteries 12 available to draw power from during instances of short peaks allows for a more flexible system of power distribution.

Figure 4:
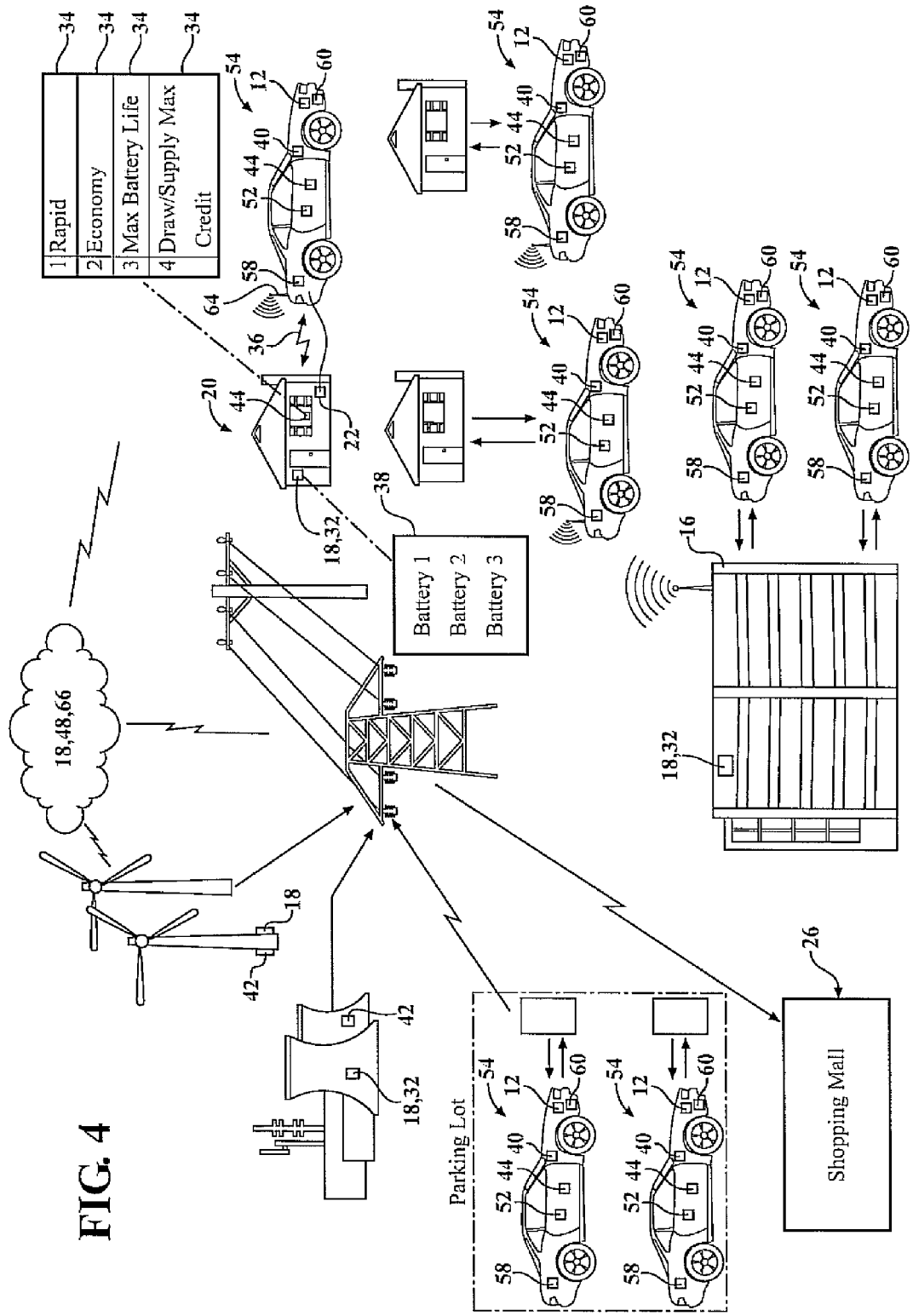
FIG. 4 is a perspective view of an embodiment of the battery optimization system used with a fleet of electric vehicles.

With reference now to FIG. 4, an illustration of the battery optimization system 10 used with a fleet of vehicles 54 is provided. The controller 18 is in remote communication with the fleet of vehicles 54 located within a predefined geographic area. With respect to the power source 14, the controller 18 can optimize supply of power from the fleet of vehicles 54 to the grid and also balance the needs of the users. For instance if the power grid detects a spike in power demand in a particular local area (such as the shopping mall), the power grid may draw power available from the vehicles 54 in the fleet that are adjacent to the area in which the spike in power demand is occurring (such as the parking lot) thus minimizing energy loss associated with transferring energy over distance and further adapting more responsively to the power demand.

In another example of optimization the controller 18 may select which vehicles 54 from the fleet of vehicles 54 to charge first based upon the availability of power and the needs of the individual batteries 12. For example if the controller 18 is provided with information from each vehicle 54 such as the length of time in which the vehicle 54 will be connected to the CD Station 16 and the level of power available in the vehicle's 54 battery 12, the controller 18 can process this information to supply power to vehicles 54 that are connected for a short period of time so as to ensure that those vehicles 54 are properly charged or fully charged in accordance with the desires and needs of the user as opposed to vehicles 54 which will be connected to the CD Stations 16 for a longer period of time.

Figure 5:
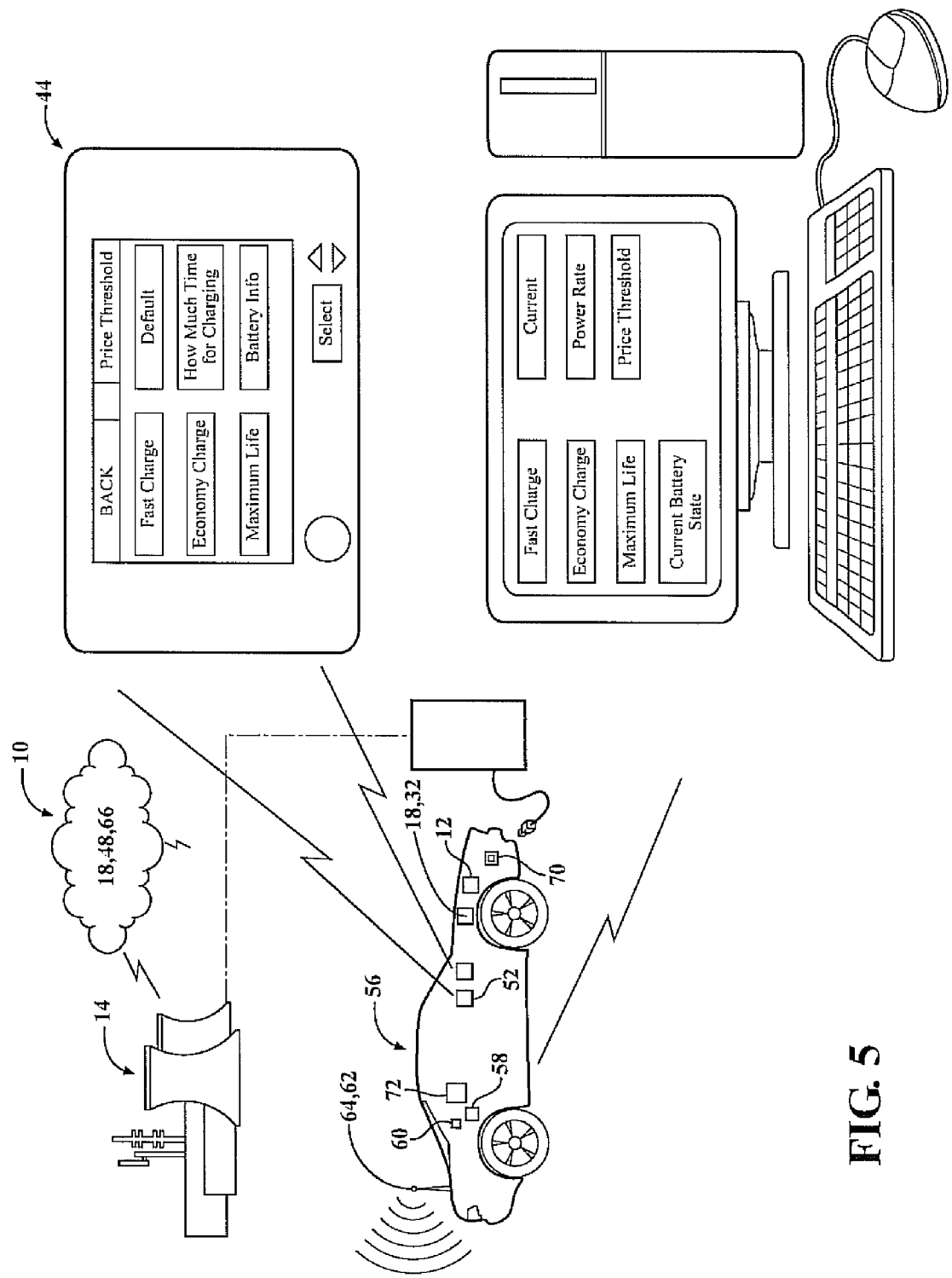
FIG. 5 is a perspective view of an electric vehicle with an input operable to provide user preferences to the controller.

With reference now to FIG. 5, an electric vehicle 56 having a battery optimization system 10 for optimizing the charge and discharge of a battery 12 is provided. The electric vehicle 56 includes a battery 12 operable to assist with the actuation of the electric vehicle's 56 drive train. The electric vehicle 56 further includes a connector 70 for connecting the vehicle 54 to a power source 14 so as to charge or discharge the battery 12. It should be appreciated by those skilled in the art that the connector 70 is not necessarily hard wiring the vehicle 54 to the power source 14, but may also connect the vehicle 54 to the power source 14 remotely using electro-magnetic power transfer. The electric vehicle 56 further includes a controller 18. The controller 18 is disposed in the electric vehicle 56 and is in communication with the connector 70 and the battery 12. The controller 18 includes a processor 32 operable to process battery 12 and power source 14 information and user preferences so as to calculate an OCDC 34. The OCDC 34 is configured to charge or discharge the battery 12 so as to optimize the use of the battery 12 in accordance with the user's preference. The controller 18 further regulates power from the power source 14 so as to charge or discharge the battery 12 according to the optimal charging/discharging cycle.

The electric vehicle 56 may further include an input 44 in communication with the controller 18. The input 44 may be mounted onto the instrument panel of the electric vehicle 56 such as a touch screen display or voice activated display as shown in FIG. 5. The input 44 is operable to transmit a charging preference to the controller 18. Preferably the charging preferences are provided in a list that is displayed on the instrument panel of the electric vehicle 56. For example one charging preference indicated by "Fast Charge," relates to charging the electric vehicle's 56 battery 12 to full capacity as quickly as possible. Another charging preference indicated by "Economy Charge," relates to charging the electric vehicle 56 during times other than peak times, or supplying power to the power source 14 during times when credit is given. Yet, another charging preference indicated by "Maximum Life," indicates charging the battery 12 so as to reduce the depth of discharge and extend the life of the battery 12.

The controller 18 processes the selected charging preference so as to calculate the charging/discharging cycle of the battery 12 that optimizes charging and discharging of the battery 12 in accordance with the user's demands. In the event that the user does not select one of the available charging preferences, the controller 18 may automatically select a charging preference based upon the historic use of the electric vehicle 56. For instance the electric vehicle 56 may include a load predictor 72 that provides the predicted load 36 demand for a particular day. Alternatively, the controller 18 may select a default preference. The default preference is one of the available preferences which the user selects as being the default.

The vehicle 54 may further include a transmitter 64 and a receiver 62 operable to transmit and receive signals from the power source 14, or a web-based server 48. The signals carry information relating to the state of the battery 12 and power source 14. The controller 18 may be housed in the web-based server 48 and processes this information onsite along with the user preference so as to calculate the optimal charging/discharging cycle. Accordingly the electric vehicle 56 can charge and discharge power at multiple locations in accordance with the optimal charging/discharging cycle.

In operation the battery optimization system 10 is configured to optimize the charging and discharging of power from a battery 12 based upon the user's desires. The power source 14 preferably is a commercial power provider with a plurality of charging and discharging stations such as commercial outlets that are available for the electric vehicles 56 to connect to. The controller 18 may be housed remotely from the battery 12 or may be located with the battery 12.

The controller 18 is operable to receive information from the power source 14, battery 12 and the user so as to optimize the charging and discharging of the battery 12. The input 44 may be provided in the vehicle 54 or remotely at a computer terminal. In the case where the input 44 is provided remotely, the user may subscribe to a service hosting the battery optimization system 10. Users subscribing to the battery optimization system 10 may be able to access their charging preferences by entering in a user name and password. The information may be transmitted to the power source 14 and to the controller 18 through a secured wireless transmission.

Each user may change their charging/discharging cycle based upon their needs as indicated by their input. These needs are processed by the controller 18 and may be transmitted to the vehicle 54 or the CD Station 16. For instance, a user short on money may optimize the charging/discharging cycle so as to charge and discharge the vehicle 54 at the lowest rate possible and yet supply power to the grid at times when an optimal credit or refund is provided. If the user changes his or her preference, the user can simply input 44 into the controller 18 the desired change, for instance changing the charging/discharging cycle from a cost-effective cycle to a cycle that extends the life of the battery 12. Accordingly the battery optimization system 10 takes into account the user's preferences so as to optimize the use of the battery 12 by charging and discharging power from the battery 12 to the commercial power grid at the user's desires.

With reference now to FIGS. 6A-6E, a method 74 for charging or discharging a vehicle 54 battery 12 in accordance with a user's preference is provided. The method 74 begins with the step of gathering information related to the power source 14 and the battery 12, and the user's preferences. Preferably the method 74 includes the step of providing an input 44 operable by the user to provide his/her preferences, a controller 18 having a processor 32 for processing the information so as to calculate an optimal charging/discharging cycle (OCDC 34) based upon the user's preference. Specifically, the controller 18 processes power source 14 information, battery 12 information, and user preference so as to calculate an optimal charging/discharging cycle that is based in part upon the state of the power source 14 and the battery 12 and the user preference. The method 74 includes the step of providing a CD Station 16 interconnecting the battery 12 with the power source 14.

The controller 18 is in communication with the CD Station 16. The CD Station 16 is operable to draw power from the power source 14 to the battery 12, and to draw power from the battery 12 to the power source 14. The input 44 is operable to provide a list of charging/discharging preferences 46. Preferably, the input 44 includes a default preference from which the user may choose. The controller 18 actuates the default preference when the user either fails to choose a charging/discharging preference, or when the charging/discharging preference is not desirable in view of the state of the power source 14 or the battery 12.

For instance, if the user chooses to charge the battery 12 as rapidly as possible, the controller 18 processes that demand and leverages the demand of the user with the state of the power source 14 and the state of the battery 12. In some instances, the user may input 44 to the controller 18 that the vehicle 54 will be available for six hours of charging, and thus there is no need to charge the vehicle 54 as rapidly as possible. Assume, for illustrative purposes, the default charging/discharging preference is an "Economy Charge." In such a case, the controller 18 may charge the vehicle 54 in accordance with the "Economy Charge," wherein the controller 18 charges the vehicle 54 only during off-peak hours.

Figure 6A:
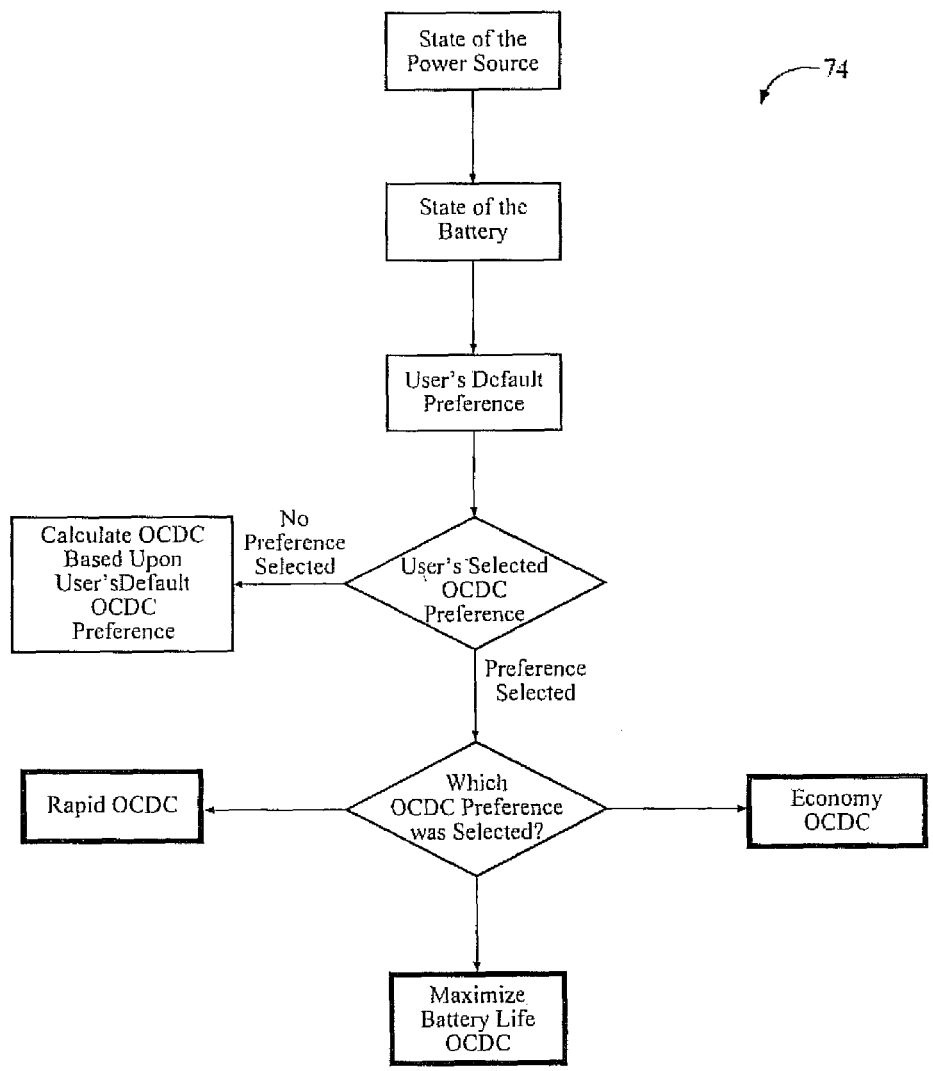
FIG. 6A is a chart showing a method for calculating an optimal charging/discharging cycle.

With reference specifically to FIG. 6A, illustrative charging/discharging preferences are provided. The user may establish a default charging/discharging preference. The default charging/discharging preference may be one of the three available charging/discharging options: "Rapid OCDC," "Economy OCDC," and a charge which "Maximizes Battery Life OCDC." As used herein, "Rapid OCDC" relates to an OCDC 34 which charges the battery 12 as quickly as possible, "Economy OCDC" relates to an OCDC 34 which charges the battery 12 as cheaply as possible, and "Maximizes Battery Life OCDC" relates to an OCDC 34 which charges the battery 12 so as to maximize the life of the battery 12.

Figure 6B:
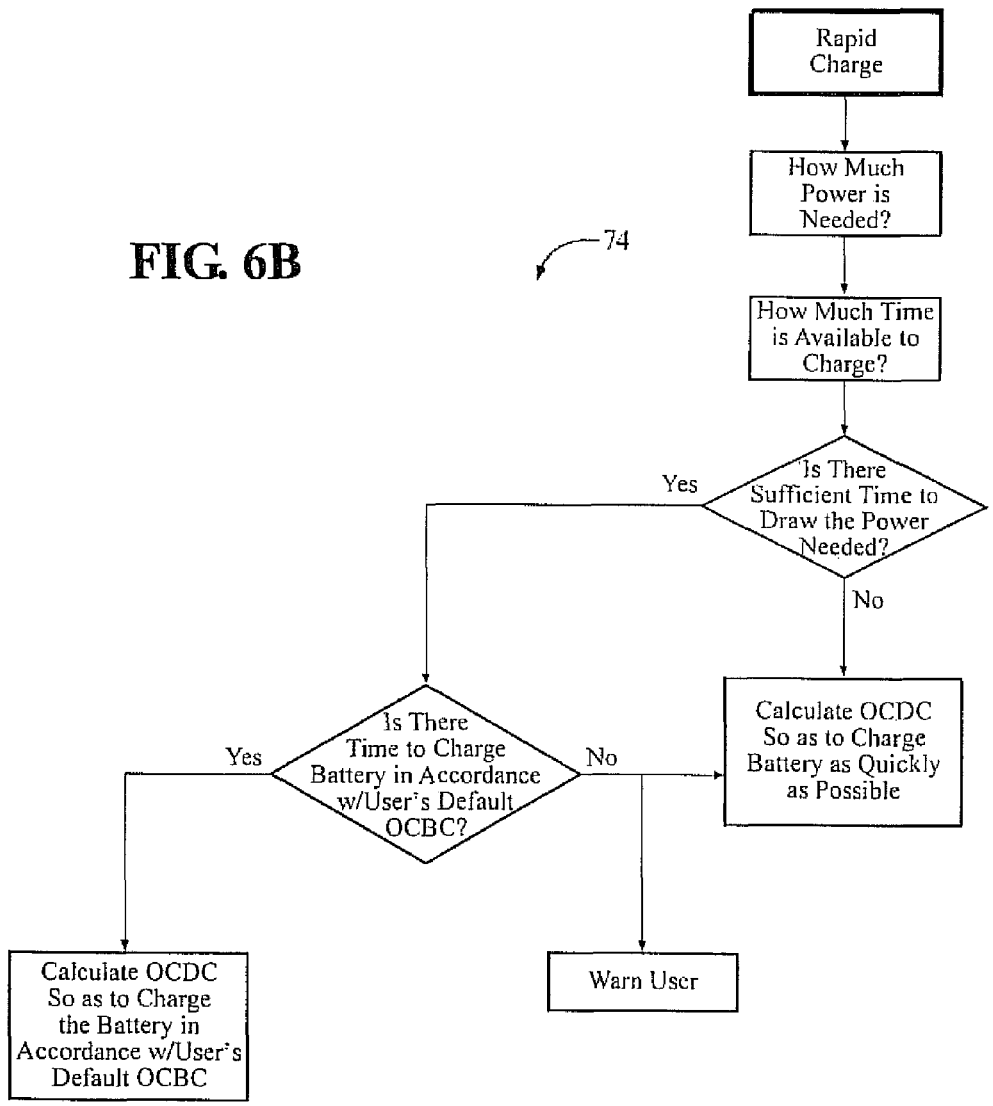
FIG. 6B is a chart showing the steps for calculating an optimal charging/discharging cycle configured to charge the battery as rapidly as possible.

With reference now to FIG. 6B, an illustration of the method 74 wherein a "Rapid OCDC" is selected is provided. The controller 18 determines how much power is needed to charge the battery 12 to its maximum capacity and how much time is available for charging. The time available for charging may be provided by the user in the form of a query, and the state of the battery 12 and power source 14 is gathered by the controller 18 and may include the current load capacity and current demand. The information is then processed so as to calculate an optimal charging/discharging cycle that rapidly charges the battery 12 in accordance with the user's preference.

Assume that the user inputs 44 to the controller 18 that the vehicle 54 is available to charge for three hours, and that the user's default OCDC 34 is an "Economy OCDC." Also assume for illustrative purposes, that the battery 12 is 20% below capacity and that the power source 14 is at a peak time, meaning that the current demand exceeds its current load capacity. The method 74 asks whether there is sufficient time to draw the power needed to charge the battery 12. If it only takes one hour to charge the battery 12 to 100% capacity and in one hour the power source 14 will be below the load capacity of the power source 14, the controller 18 might calculate an OCDC 34 based upon the user's default OCDC- "Economy OCDC." Thus, the controller 18 may begin to charge the vehicle 54 when the demand of the power source 14 is below the load capacity so as to prevent the user from incurring premium prices for drawing battery 12 from the power source 14.

Conversely, if the user chooses to charge the battery 12 as rapidly as possible and the battery 12 again is at 80% capacity but has only one hour available for charging which occurs during peak rates, then the controller 18 will calculate an optimal charging/discharging cycle which draws as rapidly as possible as much power from the power source 14 regardless of the state of power demand imposed upon the power source 14.

Figure 6C:
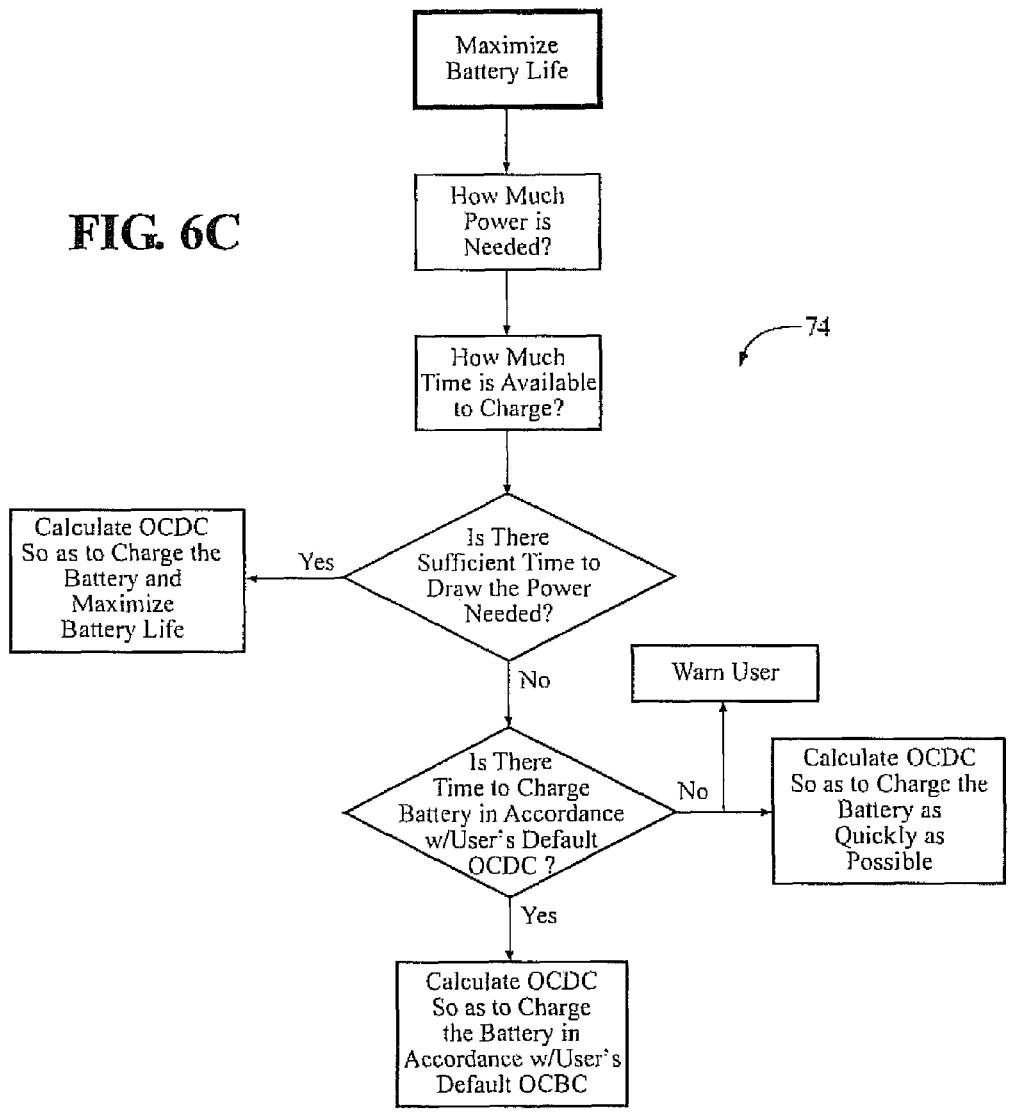
FIG. 6C is a chart showing the steps for calculating an optimal charging/discharging cycle configured to maximize the life of the battery.

With reference now to FIG. 6C, an illustration of the method 74 wherein a "Maximize Battery Life OCDC" is selected is provided. Again the controller 18 processes this request with the current state of the power source 14 and the battery 12. The method 74 proceeds to the step of asking how much power is need and how much time is available to charge the battery 12 so as to determine if there is sufficient time to draw the power needed.

For illustrative purposes assume that the battery 12 is at 40% capacity and the load predictor calculates that the battery 12 must be at 60% capacity in order to meet the predicted load 36 used by the driver. The method 74 further determines if there is sufficient time to charge the battery 12 in accordance with the user's default OCDC 34.

If there is sufficient time, then the controller 18 calculates an OCDC 34 which will optimize the life of the battery 12, such as decreasing the depth of charging and discharging based upon the amount of time available for charging and the capacity requirements needed to meet the predicted load 36.

If there is insufficient time, then the method 74 determines if there is sufficient time to charge the battery 12 in accordance with the user's default OCDC 34. If there is, then the controller 18 proceeds to calculate an OCDC 34 based upon the user's default preference. If there is insufficient time to charge the battery 12 in accordance with the user's default OCDC 34 then the controller 18 calculates an OCDC 34 so as to charge the battery 12 as rapidly as possible.

Figure 6D:
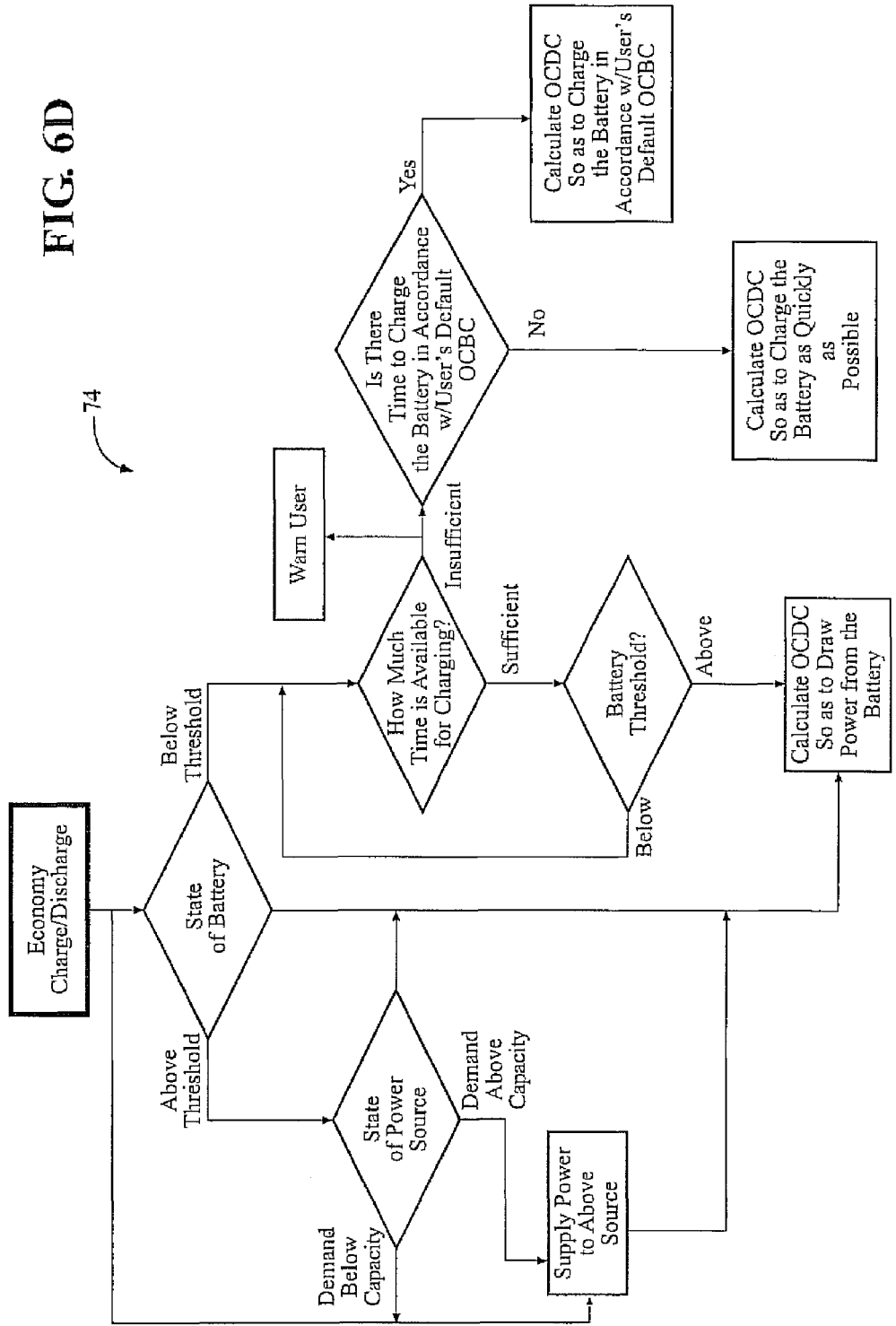
FIG. 6D is a chart showing the steps for calculating an optimal charging/discharging cycle configured to charge the battery based upon the demand on the power source.
Figure 6E:
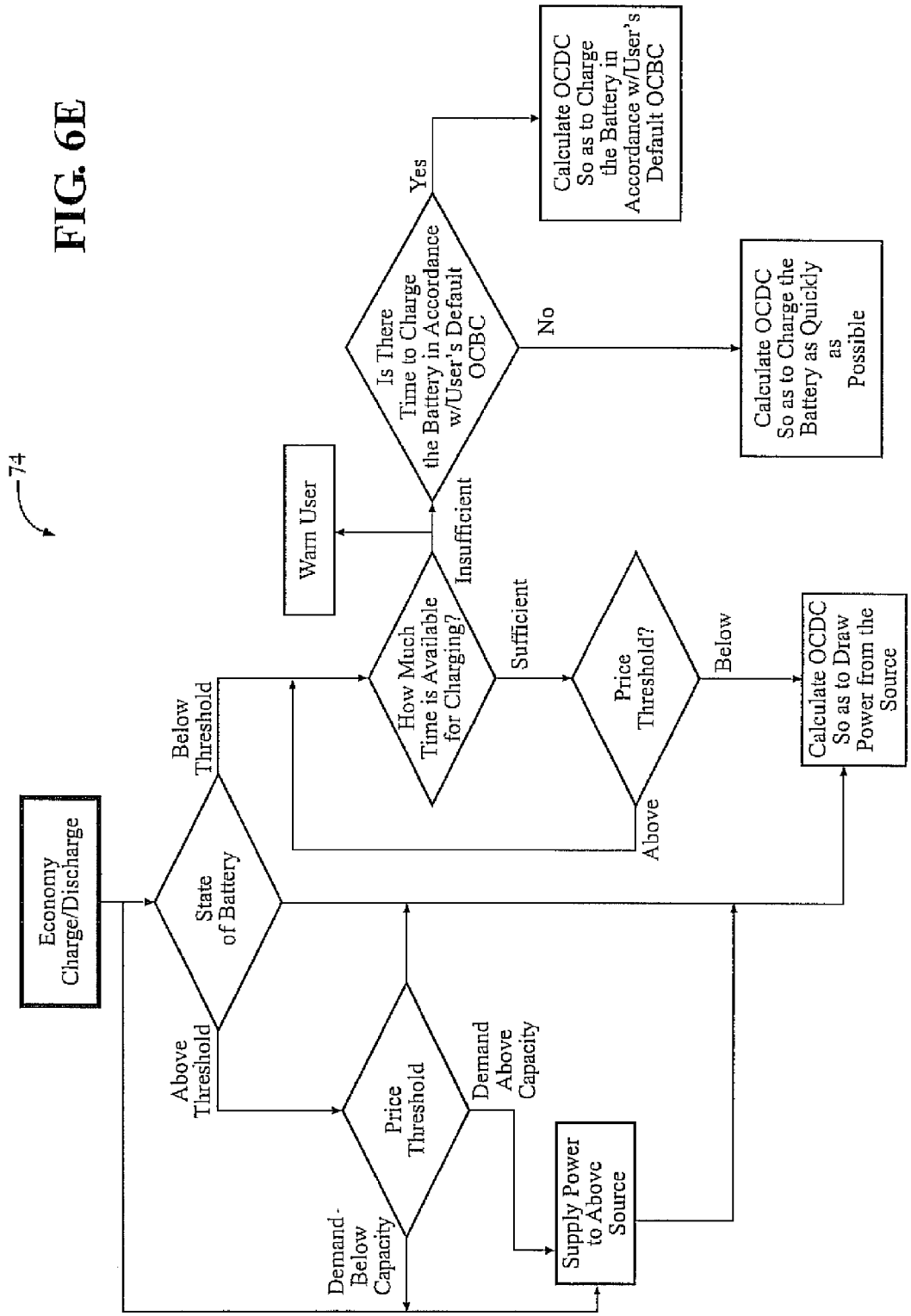
FIG. 6E is a chart showing the steps for calculating an optimal charging/discharging cycle configured to charge the based upon what the user is willing to pay.

With reference now to FIGS. 6D and 6E, an illustration of the method 74 wherein an "Economy OCDC" is selected is provided. The method 74 proceeds to determining the state of the battery 12, and establishes a threshold. The threshold relates to how much power is available in the battery 12 and the predicted load 36 placed on the battery 12. These two factors help determine whether the battery 12 should draw power from the power source 14, or supply power to the power source 14. The predicted load 36 may be learned by the controller 18 through the load predictor that provides the predicted load 36 demand for a particular day.

If the method 74 determines that battery 12 is above the threshold, then the method 74 proceeds to determining the state of the power source 14. If the demand on the power source 14 is above the capacity of the power source 14, then the method 74 proceeds to supplying power to the power source 14. This continues until the battery 12 is below the threshold and the demand on the power source 14 is below the capacity of the power source 14, upon which the battery 12 draws power from the power source 14.

If the method 74 determines that the battery 12 is below the threshold, then the method 74 determines how much time is available for charging. If the method 74 determines that there is insufficient time to perform an Economy OCDC 34 based upon the time available and the power needed, then the method 74 provides two OCDCs to choose from. Specifically, the method 74 determines if there is sufficient time to charge the battery 12 in accordance with the user's default OCDC 34 and charges the battery 12 in accordance with the calculated default OCDC 34 when there is sufficient time to do so. In cases where there is insufficient time to charge the battery 12 in accordance with the user's default OCDC 34, the method 74, proceeds to the step of calculating a Rapid OCDC 34 so as to charge the battery 12 as quickly as possible.

Where there is sufficient time to charge the battery 12, the method 74 proceeds to determine the state of the power source 14. In instances where the power source 14 is at a peak rate, e.g. the demand exceeds the capacity; the method 74 determines how much time is available for charging. The method 74 continues with this query until there is either insufficient time for charging, of the capacity of the power source 14 exceeds the demand. In cases where the capacity of the power source 14 exceeds the demand, the method 74 proceeds to calculate an Economy OCDC 34 so as to charge the battery 12 during at an off-peak rate.

Alternatively, the method 74 may include a price threshold determination. The price threshold is the cost for drawing power that the user is willing to pay. Thus, the method 74 draws power from the power source 14 when the power source 14 is offering power at a cost below the price threshold. In instances where there is sufficient time, and the cost for drawing power is above the threshold, the method 74 cycles through the query until either there is insufficient time to draw power, or the cost falls below the price threshold. Thus the charging/discharging cycle is operable to reduce the cost of charging the vehicle 54.

Again the controller 18 may process this request with other information such as how much time is available for charge and the predicted load 36 of the battery 12. Thus in some instances although the user prefers to charge the vehicle 54 at the lowest cost possible, the predicted load 36 and the time available for charging may not allow the vehicle 54 to do so without meeting the predicted load 36 demands. Accordingly the method 74 may further include the step of sending a warning to the vehicle 54 that the requested charging cycle may not be feasible and that the vehicle 54 will not be charged sufficiently to meet the predicted load 36 demand given the amount of time available is during peak times.

The invention has been described in an illustrative manner. It is to be understood that the terminology which has been used is intended to be in the nature of words of description rather than limitation. Many Modifications and variations of the invention are possible in light of the above teachings. Therefore, within the scope of the appended claims, the invention may be practiced other than as specifically described.

We claim:

1. A battery optimization system for regulating charging and discharging of a battery so as to optimize the use of the battery, the battery optimization system comprising:
   a power source;
   a charging/discharging station interconnecting the battery with the power source;
   a controller in communication with the charging/discharging station and the battery, the controller having a processor operable to calculate a battery charging/discharging cycle configured to charge or discharge the battery;
   a display having a plurality of charging preferences;
   an input in communication the display and with the controller, the input actuated by the user and configured to prioritize each of the charging preferences in the plurality of charging preferences in accordance with the user's selection so as rank the charging preferences in a list of preferences, the input further operable to transmit the list of preference selected by the user to the controller, the controller calculating the charging/discharging cycle in accordance with the highest ranked charging preference available with respect to the state of the battery, and the state of the charging/discharging station in instances where the user does not select the charging preference.

2. The battery optimization system as set forth in claim 1, wherein the charging/discharging cycle is directly related to the level of power in the battery.

3. The battery optimization system as set forth in claim 2, further including a first sensor in communication with the battery, the first sensor operable to detect the level of power in the battery, the controller in communication with the first sensor and processing the level of power in the battery so as to selectively actuate the charging/discharging station in accordance with the charging/discharging cycle and charge or discharge the battery.

4. The battery optimization system as set forth in claim 3, further including a second sensor in communication with the power source and the controller, the second sensor operable to detect the load demand of the power source, the controller processing the load demand to selectively actuate the charging/discharging station.

5. The battery optimization system as set forth in claim 4, further including a regulator in communication with the controller and the power source, the regulator processing the needs of the battery with the load demand of the power source to produce a charging/discharging rate, the regulator transmitting the charging/discharging rate to the controller, the controller processing the charging/discharging rate to calculate the charging/discharging cycle.

6. The battery optimization system as set forth in claim 5, wherein the controller is operable to prevent the charging/discharging station from charging the vehicle when the load demand reaches a predetermined threshold.

7. The battery optimization system as set forth in claim 5, further including a pricing agent in communication with the power source, the pricing agent operable to provide a price for drawing power from the power source and a refund for supplying power to the power source.

8. The battery optimization system as set forth in claim 7, wherein the charging preference is one from a list of charging preferences including charging the battery as quickly as possible, charging the battery at the cheapest price, and charging the battery to optimize the life of the battery.

9. The battery optimization system as set forth in claim 1, wherein the controller includes a load sensor, the load sensor in communication with the battery and operable to detect the amount of load experienced by the battery over a predetermined period of time, the controller processing the amount of load experienced by the battery over a predetermined period of time so as to calculate a predicted load, the controller processing the predicted load so as selectively actuate the charging/discharging station.

10. The battery optimization system as set forth in claim 1, further including a receiver and a transmitter, the receiver operatively attached to the charging/discharging station and the transmitter operatively attached to the controller, the transmitter transmitting signals to the receiver so as to selectively actuate the discharging/charging station remotely.

11. The battery optimization system as set forth in claim 1, wherein the input is further operable to transmit to the controller the duration of time in which the battery is available for charging/discharging operations, the controller processing the duration of time to calculate the charging/discharging cycle.

12. The battery optimization system as set forth in claim 1, further including a list of batteries, the list of batteries having information relating to charging and discharging functions for each battery in the list, the list of batteries programmed into the controller.

13. The battery optimization system as set forth in claim 1, wherein the plurality of charging preferences including an optimal charging/discharging cycle configured to charge the battery as quickly as possible, an optimal charging/discharging cycle configured to charge the battery as inexpensively as possible, and an optimal charging/discharging cycle configured to maximize the life of the battery.

14. The battery optimization system as set forth in claim 13, further including a server, wherein the server is operable to transmit information from the controller to the charging/discharging station so as to actuate the charging/discharging station and charge or discharge the battery according to the selected optimal charging/discharging cycle.

15. The battery optimization system as set forth in claim 14, wherein the server is actuated by a web-based service provider.

16. An electric vehicle having a battery operable to assist with the actuation of the vehicle's drive train, the electric vehicle having a connector for connecting to a power source so as to charge or discharge the battery, the electric vehicle comprising:
   a controller disposed in the electric vehicle, the controller in communication with the battery;
   a display having a plurality of charging preferences;
   an input in communication the display and with the controller, the input operable by a user to select one of the charging preferences on the display, the input further operable to transmit to the controller one of the plurality of charging preferences selected by the user, the controller processing the state of the battery and the charging/discharging station so as to calculate the charging/discharging cycle according to the charging preference selected by the user.

17. An electric vehicle as set forth in claim 16, wherein the plurality of charging preference is one from a list of charging preferences including charging the battery as quickly as possible, charging the battery at the cheapest price, and charging the battery to optimize the life of the battery.

18. An electric vehicle as set forth in claim 16, further including a transmitter and a receiver operable to transmit and receive signals from the power source, the controller processing the signals so as to charge or discharge the battery in accordance with the charging/discharging cycle.

19. A method for calculating an optimal charging/discharging cycle configured to charge and discharge a battery, the battery coupled to a power source, the power source configured to charge the battery or draw power from the battery, the optimal charging/discharging cycle configured to optimize the use of the battery in accordance with a user's preference, the method comprising the steps of:

providing a controller configured to determine the state of the power source, the controller further configured to detect the state of the battery, the controller having a processor configured to calculate a charging/discharging cycle, the charging/discharging cycle configured to charge or discharge the battery;

providing a display having a plurality of charging preferences;

providing an input configured to select one of the charging preferences on the display, the input further configured to prioritize each of the charging preferences in the plurality of charging preferences so as to rank the charging preferences in a list of preferences; and the processor further configured to automatically calculate the charging/discharging cycle in accordance with the highest ranked charging preference available with respect to the state of the battery, and the state of the charging/discharging station in instances where the user does not select a charging preference.

20. The method as set forth in claim 19, wherein the plurality of charging preferences includes an optimal charging/discharging cycle configured to charge the battery as inexpensively as possible, and an optimal charging/discharging cycle configured to maximize the life of the battery, and an optimal charging/discharging cycle configured to charge the battery as quickly as possible.

21. The method as set forth in claim 20 further including the step of providing an input, the input operable to select one of the optimal charging/discharging cycles from the list of preferences.

* * * * *